US012743762B2

(12) United States Patent
Rocher et al.

(10) Patent No.: US 12,743,762 B2
(45) Date of Patent: Sep. 22, 2026

(54) SYSTEM AND METHOD FOR EVALUATING COMPONENTS USING THERMOGRAPHY

(71) Applicant: PRATT & WHITNEY CANADA CORP., Longueuil (CA)

(72) Inventors: Guy Joel Rocher, Mont-Royal (CA); Jing Fang, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 194 days.

(21) Appl. No.: 18/821,005

(22) Filed: Aug. 30, 2024

(65) Prior Publication Data

US 2026/0065451 A1 Mar. 5, 2026

(51) Int. Cl.

| | |
|---|---|
| ***G16H 15/00*** | (2018.01) |
| ***G06T 7/00*** | (2017.01) |
| *G03G 15/00* | (2006.01) |
| *G03G 15/02* | (2006.01) |

(52) U.S. Cl.

CPC ........... *G06T 7/0002* (2013.01); *G03G 15/02* (2013.01); *G03G 15/50* (2013.01); *G06T 2207/10048* (2013.01); *G06T 2207/20081* (2013.01); *G06T 2207/30164* (2013.01)

(58) Field of Classification Search

None

See application file for complete search history.

(56) References Cited

U.S. PATENT DOCUMENTS

| | | | |
|---|---|---|---|
| 6,698,288 | B2 | 3/2004 | Shirzad et al. |
| 9,964,503 | B2 | 5/2018 | Lucon et al. |
| 9,976,967 | B2 | 5/2018 | Bense et al. |
| 10,191,014 | B2 | 1/2019 | Hull et al. |
| 2004/0056200 | A1 | 3/2004 | Rothenfusser et al. |
| 2018/0104742 | A1 | 4/2018 | Kottilingam et al. |
| 2019/0064119 | A1 | 2/2019 | Williams |

(Continued)

FOREIGN PATENT DOCUMENTS

| | | | |
|---|---|---|---|
| CN | 112285161 | A | 1/2021 |
| CN | 115456938 | A | 12/2022 |
| JP | 2024011106 | A | 1/2024 |

OTHER PUBLICATIONS

Wang Rongcai et al: “A Review of Fault 1-15 Diagnosis Methods for Rotating Machinery Using Infrared Thermography”, Micromachines (Basel), vol. 13, No. 10, Sep. 30, 2022 (Sep. 30, 2022), p. 1644, XP093316689, Switzerland ISSN: 2072-666X, DOI: 10.3390/mi13101644, p. 1, paragraph 1. Introduction—p. 3, p. 8, paragraph 3, p. 14, paragraph 4.

(Continued)

*Primary Examiner* — Haris Sabah

(74) *Attorney, Agent, or Firm* — Norton Rose Fulbright Canada LLP

(57) ABSTRACT

Systems and methods for non-destructive evaluation of components using infrared thermography are provided. A method includes mechanically exciting the component, and using an infrared sensor to acquire a thermographic image of part of the component containing a defect. Using a machine learning algorithm, a health condition of the component is determined based on the new thermographic image. The machine learning algorithm is trained using machine learning and historical data associating previous thermographic images with previous remaining service lives for the component.

20 Claims, 12 Drawing Sheets

(56) References Cited

U.S. PATENT DOCUMENTS

| | | | | |
|---|---|---|---|---|
| 2019/0265178 | A1 | 8/2019 | Martin et al. | |
| 2022/0398550 | A1* | 12/2022 | Ni | G05B 23/0283 |
| 2024/0142312 | A1* | 5/2024 | Dangler | G01J 5/48 |
| 2024/0212811 | A1* | 6/2024 | Vogler | G06N 3/084 |

OTHER PUBLICATIONS

Jaeger Benedict E et al: "Infrared 1-15 Thermal Imaging-Based Turbine Blade Crack Classification Using Deep Learning", Journal of Nondestructive Evaluation., vol. 41, No. 4, Oct. 19, 2022 (Oct. 19, 2022), XP093300118, US ISSN: 0195-9298, DOI: 10.1007/s10921-022-00907-9, the whole document.

EP25199472, European Search Report mailed Jan. 12, 2026.

* cited by examiner

124
Health
Condition(s)
134
129
Computer(s)
Excitation
Driver(s)
128
132
IR
Sensor(s)
130
F(t)
143
142
126
136B
140
12
R3
R2
A
22
R1
136A Mechanically exciting the component. 1002

Acquiring a thermographic image of part of the component containing a defect. 1004

Using a machine learning algorithm, determining a remaining service life of the component based on the thermographic image. 1006

Output the remaining service life of the component. 1008

52

| | Input(s) 54 | Output(s) 56 | |
|---|---|---|---|
| Sample Number | Thermographic Image | Remaining Service Life (% of nominal) | Service Category |
| 1 |  | 88% | Acceptable |
| 2 |  | 42% | Needs Rework |
| 3 |  | 97% | Acceptable |
| 4 |  | nil | Rejected |
| 5 |  | 100% | Acceptable |
| ... | ... | ... | ... |

ML Algorithm(s) 50

152

| | Input(s) 54 | | | Output(s) 56 | |
|---|---|---|---|---|---|
| Sample Number | Excitation Parameter(s) | Defect Location | Thermographic Image | Remaining Service Life (% of nominal) | Service Category |
| 1 | E1 | R1 |  | 88% | Acceptable |
| 2 | E2 | R3 |  | 42% | Needs Rework |
| 3 | E3 | R2 |  | 97% | Acceptable |
| 4 | E4 | R2 |  | nil | Rejected |
| 5 | E5 | R1 |  | 100% | Acceptable |
| ... | ... | ... | ... | ... | ... |

252A

| | Input(s) 54 | Output(s) 56 |
| --- | --- | --- |
| Sample Number | Thermographic Image | Defect Characteristic(s) |
| 1 | 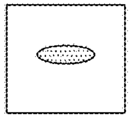 | Type: crack<br>Size: small<br>Orientation: transverse to blade axis |
| 2 | 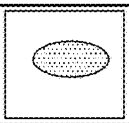 | Type: void<br>Size: medium |
| 3 |  | Type: void<br>Size: small |
| 4 |  | Type: porosity<br>Severity: high |
| 5 | | n/a |
| ... | ... | ... |

↓

250A — ML Algorithm(s)

| | Input(s) 54 | Output(s) 56 | |
| --- | --- | --- | --- |
| Sample Number | Defect Characteristic(s) | Remaining Service Life (% of nominal) | Service Category |
| 1 | Type: crack<br>Size: small<br>Orientation: transverse to blade axis | 88% | Acceptable |
| 2 | Type: void<br>Size: medium | 42% | Needs Rework |
| 3 | Type: void<br>Size: small | 97% | Acceptable |
| 4 | Type: porosity<br>Severity: high | nil | Rejected |
| 5 | n/a | 100% | Acceptable |
| ... | ... | ... | ... |

↓

250B — ML Algorithm(s)

FIG. 12B

SYSTEM AND METHOD FOR EVALUATING COMPONENTS USING THERMOGRAPHY

TECHNICAL FIELD

The disclosure relates generally to non-destructive testing, and more particularly to evaluating components using thermography.

BACKGROUND

Some components of aircraft power plants are subjected to cyclic loading during use. Internal defects such as cracks and/or voids in a component can affect the service life of the component. Existing non-destructive testing methods can provide insight on the structural integrity of a component but do not elaborate of on the future performance of the component. Improvement is desirable.

SUMMARY

In one aspect, the disclosure describes a method for quantifying a remaining service life of a component containing a defect using non-destructive infrared thermography. The method comprises:

- mechanically exciting the component to induce a thermal response in the component;
- acquiring at a computer from an infrared sensor a thermographic image of a part of the component containing the defect and taken while the component exhibits the thermal response;
- executing a machine learning algorithm to process the thermographic image to determine the remaining service life of the component based on the thermographic image; and
- generating an output indicative of the determined remaining service life of the component,
- wherein the machine learning algorithm has been trained using machine learning on historical data associating previous thermographic images with previous remaining service lives for the component.

Mechanically exciting the component may include stretching the component.

Mechanically exciting the component may include inducing a vibration in the component.

The method may comprise using the machine learning algorithm to determine the remaining service life of the component based on a parameter of a mechanical excitation used to mechanically excite the component.

The method may comprise using the machine learning algorithm to determining the remaining service life of the component based on a location of the defect on the component.

The component may be a rotor blade of an aircraft power plant. When the location of the defect is closer to a root of the rotor blade than to a tip of the rotor blade, the remaining service life may be a first remaining service life. When the location of the defect is closer to a tip of the rotor blade than to a root of the rotor blade, the remaining service life may be a second remaining service life different from the first remaining service life.

Mechanically exciting the component may include inducing frictional heating at the defect.

Determining the remaining service life of the component may include: identifying a characteristic of the defect in the component based on the thermographic image; and relating the characteristic of the defect to the remaining service life.

Mechanically exciting the component may include applying a mechanical excitation to the component to induce frictional heating at the defect. The method may include, using the machine learning algorithm, determining the remaining service life of the component based on a location of the defect within the component and based on a parameter of the mechanical excitation.

Embodiments may include combinations of the above features.

In another aspect, the disclosure describes a method of manufacturing an aircraft power plant. The method comprises:

- manufacturing a component of the aircraft power plant;
- while the component is uninstalled from the aircraft power plant:
- mechanically exciting the component to induce heating in a part of the component containing a defect;
- acquiring a thermographic image of the part of the component; and
- using a machine learning algorithm, relating the thermographic image to a health condition of the component; and
- when the health condition is indicative of the component being suitable for service, installing the component in the aircraft power plant.

The method may comprise training the machine learning algorithm using machine learning and historical data relating a previous thermographic image to a previous health condition.

Mechanically exciting the component may include acoustically exciting the component.

Mechanically exciting the component may include stretching and/or contracting the component.

The health condition may include a remaining service life of the component.

Relating the thermographic image to the health condition of the component using the machine learning algorithm may include classifying the thermographic image as belonging to a service category for the component.

Relating the thermographic image to the health condition of the component using the machine learning algorithm may include: relating the thermographic image to a characteristic of the defect; and relating the characteristic of the defect to the health condition.

Relating the thermographic image to the health condition of the component using the machine learning algorithm may be performed based on: a location of the defect on the component; and a parameter of a mechanical excitation applied to the component and associated with the thermographic image.

Embodiments may include combinations of the above features.

In a further aspect, the disclosure describes a system for non-destructive evaluation of a component using infrared thermography. The system comprises:

- a transducer operable to induce a vibration in the component;
- an infrared sensor operable to acquire a new thermographic image of the component;
- one or more data processors; and
- non-transitory machine-readable memory storing:
- a trained model trained using machine learning and historical data associating previous thermographic images with previous health conditions of the component; and
- instructions executable by the one or more data processors and configured to cause the one or more data processors to:

using the trained model and the new thermographic image, assign a health condition to the component based on the new thermographic image; and generate an output indicative of the health condition of the component.

The health condition may be a remaining service life of the component.

The health condition may be a service category for the component.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIGS. 12A and 12B show two tables containing exemplary historical data used to train a first machine learning algorithm and a second machine learning algorithm respectively using machine learning.

DETAILED DESCRIPTION

The present disclosure describes systems and methods for evaluating components of an aircraft power plant using thermography. In some embodiments, the methods and systems described herein may acquire a thermographic image when an induced vibration (e.g., mechanical excitation) is applied to the component and, assess a health condition of the component based on the thermographic image. In some embodiments, the health condition (e.g., remaining service life, service category) may be estimated using a computer-implemented artificial intelligence algorithm (model) that is trained using machine learning (ML) and historical data associating previous thermographic images with previous health conditions relevant to the component. In some embodiments, the methods and systems described herein may facilitate a non-destructive testing (NDT) method that also elaborates on a future performance of the component using infrared thermography. The methods and systems described herein may be used on newly-manufactured components, newly-refurbished components and/or on in-service components to determine whether a component is suitable for service in the aircraft power plant. In some embodiments, the methods and systems described herein may improve the reliability of NDT, health monitoring and component life estimations.

Aspects of various embodiments are described through reference to the drawings.

The term "connected" may include both direct connection and indirect connection. As used herein, the singular forms "a," "an," and "the" are intended to include the plural forms as well, unless the context clearly indicates otherwise.

Figure 1:
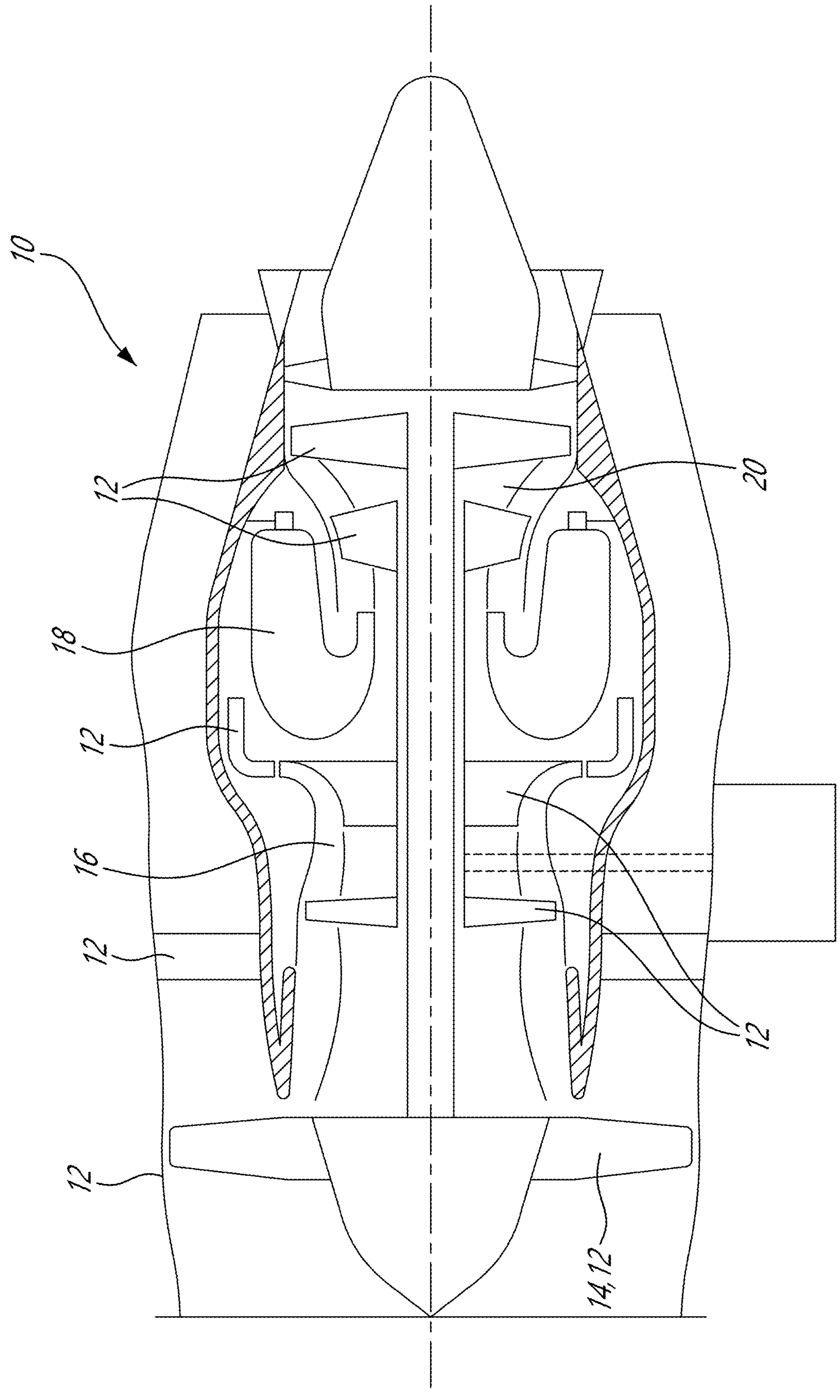
FIG. 1 shows a schematic axial cross-section view of a turbofan gas turbine engine as an exemplary aircraft power plant.

FIG. 1 illustrates an exemplary aircraft power plant 10 in the form of a turbofan gas turbine engine of a type preferably provided for use in subsonic flight. In various embodiments, power plant 10 may be configured to propel an aircraft to which power plant 10 is mounted, or power plant 10 may be an auxiliary power unit (APU) configured to perform non-propulsion functions onboard the aircraft. In some embodiments, power plant 10 may be or include a thermal engine such as gas turbine engine, a piston engine or a rotary (e.g., Wankel) engine. In some embodiments, power plant 10 may be a purely electric power plant. In some embodiments, power plant 10 may be a hybrid power plant including a thermal engine and an electric motor that cooperatively propel the aircraft. Power plant 10 may include one or more components 12 (referred hereinafter in the singular) that may be used with the methods and systems described herein in order to assess the health condition of such component(s) 12.

Power plant 10 as illustrated in FIG. 1 may generally include, in serial flow communication, fan 14 through which ambient air is propelled, multistage compressor 16 for pressurizing the air, combustor 18 in which the compressed air is mixed with fuel and ignited for generating an annular stream of hot combustion gases, and turbine section 20 for extracting energy from the combustion gases. In various embodiments, component 12 may include a rotor blade or a stator vane that is intended to be part of compressor 16, a rotor blade or a stator vane that is intended to be part of turbine section 20, a blade of fan 14, a bladed disc, or another relatively rigid component such as a duct (e.g., tube), a casing (shroud) surrounding fan 14, a structural brace such as a strut for example. In some embodiments, component 12 may be a single/sole part having a unitary (i.e., monolithic) construction.

In various embodiments, component 12 may be made from a metallic material, a polymer, a ceramic and/or a fiber-reinforced composite material including (e.g., carbon) fibers that are embedded in a polymeric matrix for example. Component 12 may be manufactured using one or more known or other manufacturing processes. In various embodiments, component 12 may be manufactured using one or more processes such as additive manufacturing (e.g., layer-by-layer 3D printing), (e.g., investment) casting, (e.g., metal, resin) injection moulding, forging, stamping, and/or subtractive manufacturing (e.g., machining, grinding, drilling) for example. In some embodiments, component 12 may be a cast metallic component.

In some situations, component 12 may include one or more (e.g., internal or surface) defects 22 (shown in FIG. 2) that may affect the service life of component 12. For example, defect 22 may include a crack, a void, an inhomogeneity, corrosion, a disbond in a composite material, a delamination in a composite material, and/or a flaw resulting in broken fibers in fiber-reinforced materials. Defect 22 may include a (e.g., shrinkage) casting defect such as microporosity or microshrinkage (i.e., voids in the form of stringers shorter than shrinkage cracks), which can be difficult to detect with existing NDT methods using x-rays due to the alignment of voids, grain diffraction, and potentially other factors. In some situations, additively manufactured components may exhibit an internal defect 22 due to structural complexities, material variability and potentially other factors.

Defect 22 may be generated during manufacturing and/or during service. The influence of defect 22 on the service life of component 12 may depend on the type, size and location of defect 22, and may also depend on the function of component 12 and the operating conditions of component 12 during the operation of power plant 10. For example, when component 12 is subjected to cyclic loading (e.g., low-cycle fatigue or high-cycle fatigue), the presence of internal and/or surface defect 22 may increase the risk of fatigue crack initiation and/or crack propagation within component 12 and affect the service life of component 12.

Some existing NDT methods may offer observations on the structural integrity of component 12 but do not elaborate on the future performance or service life of component 12. The methods and systems described herein may facilitate the determination of a health condition (e.g., remaining service life, service category) of component 12 using a computer-implemented artificial intelligence algorithm (model) trained using historical data and ML for example.

Figure 2:
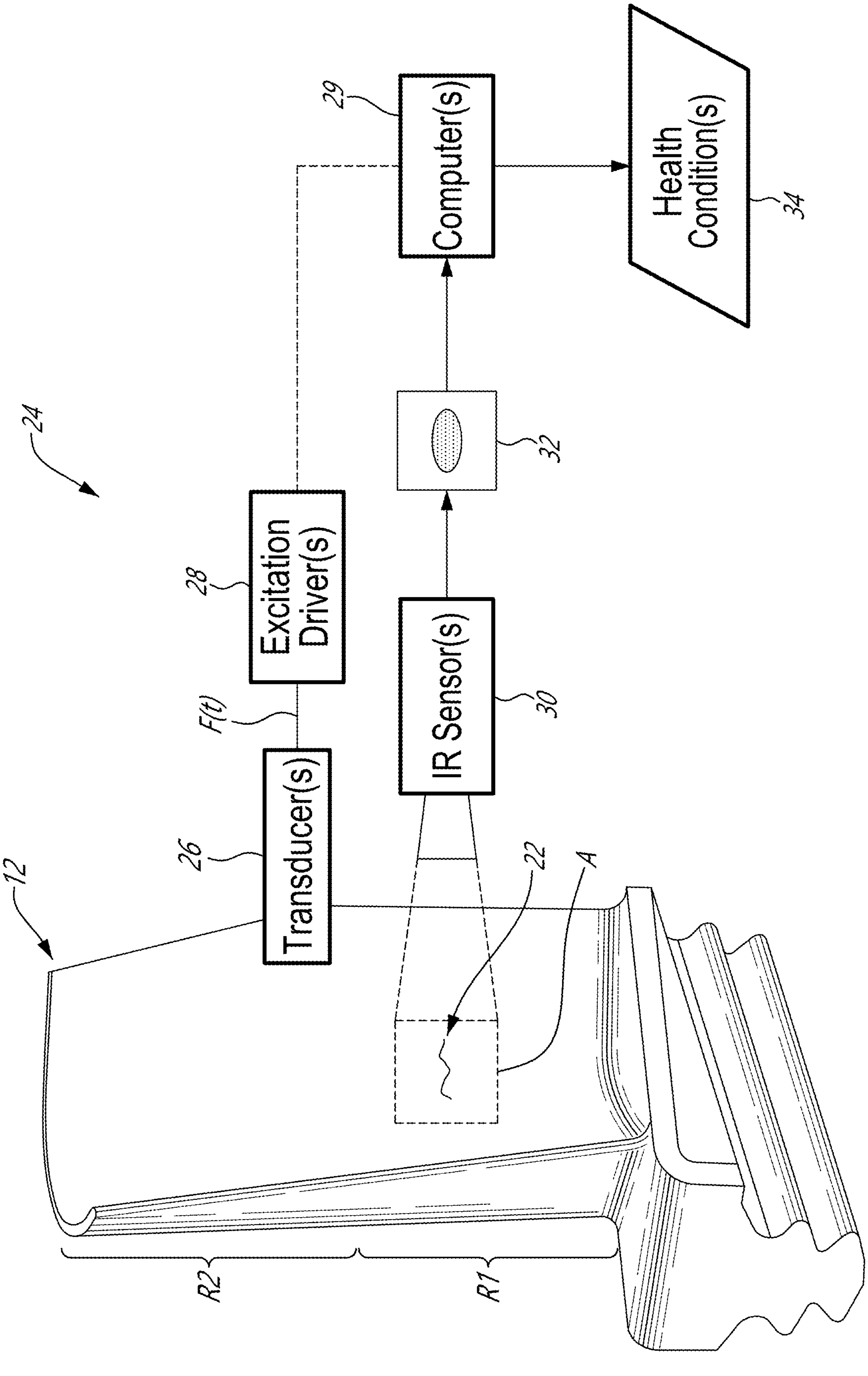
FIG. 2 is a schematic illustration of an exemplary system for evaluating a component of the aircraft power plant.

FIG. 2 is a schematic illustration of an exemplary system 24 for determining a health condition of component 12 using infrared non-destructive testing of materials with thermography. Infrared thermography uses a thermography measurement of a thermal response of a material during and/or shortly after mechanical excitation of the material. The mechanical excitation of component 12 may be provided using transducer 26, which may be an acoustic probe (e.g., ultrasonic horn) acoustically coupled to component 12, and/or a (e.g., hydraulic, pneumatic or electric) actuator drivingly coupled to component 12. Transducer 26 may be configured to convert energy in one form to energy in another form. In some embodiments, the excitation of component 12 may be provided electromagnetically. In various embodiments, the excitation may be delivered to component 12 using contact or non-contact methods. In some embodiments, as shown in FIG. 2, the excitation of component 12 may be provided mechanically using transducer 26.

When using mechanical excitation of component 12, transducer 26 may induce a vibration into component 12. Transducer 26 may be operable in a controlled manner to input a vibration represented as a cyclic excitation F(t) (i.e., as a function of time) into component 12. In some embodiments, transducer 26 may include an actuator controlled (e.g., driven) by excitation driver 28 (e.g., controller), which may optionally be operatively connected to computer 29. Excitation driver 28 may operate independently of computer 29 or may operate under the control/supervision of computer 29. In some embodiments, excitation driver 28 and computer 29 may be in data communication with each other so that parameters (e.g., amplitude, frequency) of the excitation may be communicated from computer 29 to excitation driver 28 or from excitation driver 28 to computer 29. The excitation delivered to component 12 may be uniform over the duration of the test, or may have one or more parameters that vary as a function of time. The excitation delivered to component 12 may be adjustable.

The mechanical excitation of component 12 or part thereof (e.g., in area A) may induce heat to be generated inside the material of component 12. For example, the presence of defect 22 may cause more heat to be generated in the vicinity of defect 22 compared to other regions devoid of defect 22 because the cyclic straining of the material may cause surfaces of defect 22 to rub together. In other words, adjacent and/or opposing surfaces of defect 22 may slide against each other and frictional heating may occur at a sliding interface of defect 22.

The excitation of component 12 may cause the material of component 12 to exhibit a thermal response that may be measured with one or more infrared (IR) detectors such as IR sensors 30 (referred hereinafter in the singular) by way of one or more digital thermographic images 32 (referred hereinafter in the singular). Since the part of component 12 containing defect 22 will generate more heat than other parts of component 12 that are devoid of defect 22, the thermal response will show an area of higher temperature that indicates the location and optionally also the type and severity of defect 22 within thermographic image 32. In some embodiments, the application of the excitation may be synchronized with the acquisition of thermographic image 32. In various embodiments, thermographic image 32 may be captured while the thermal response in the form of a temperature gradient indicative of defect 22 is being exhibited in component 12.

IR sensor 30 may be part of a suitable thermographic camera (also called an infrared camera or thermal imaging camera, thermal camera or thermal imager). IR sensor 30 may be operable to create digital thermographic image 32 using IR radiation, in a similar manner as a camera that forms an image using visible light. In some embodiments, IR sensor 30 may be sensitive to wavelengths from about 1,000 nm (1 micrometre or μm) to about 14,000 nm (14 μm).

The evaluation of component 12 may be conducted while component 12 is not currently being used in power plant 10. For example, the evaluation of component 12 may be conducted while component 12 is uninstalled from power plant 10 and held in a fixture outside of power plant 10. Alternatively, the evaluation of component 12 may be conducted while component 12 is installed in power plant 10 and power plant 10 is not in operation. In various embodiments, the mechanical excitation applied to component 12 may not be representative of an expected in-use operating condition of component 12. In other words, the applied mechanical excitation may be different from an expected in-use condition experienced by component 12 during the operation of power plant 10.

Computer 29 may be in data communication with IR sensor 30 to receive digital thermographic image 32. Using thermographic image 32 and optionally other data, computer 29 may be operable to generate one or more outputs indicative of one or more health conditions 34 (referred hereinafter in the singular) of component 12.

The impact of defect 22 on health condition 34 of component 12 may depend on one or more factors such as the type and geometry of component 12, the location of defect 22 on component 12, and other characteristics (e.g., type, severity) of defect 22. Component 12 may include different regions R1, R2 within which defect 22 may be located. For example, when component 12 is a rotor (e.g., compressor or turbine) blade as shown in FIG. 2, and defect 22 is in first region R1 closer to a root of the rotor blade, the remaining service life may be a first (e.g., lower) remaining service life.

However, when the location of defect 22 is in second region R2 closer to a tip of the rotor blade, the remaining service life may be a second (e.g., higher) remaining service life different from the first remaining service life. In other words, a defect 22 in a more defect-sensitive location on component 12 may have a different impact on health condition 34 than an identical defect 22 at another less defect-sensitive location on component 12.

Figure 3:
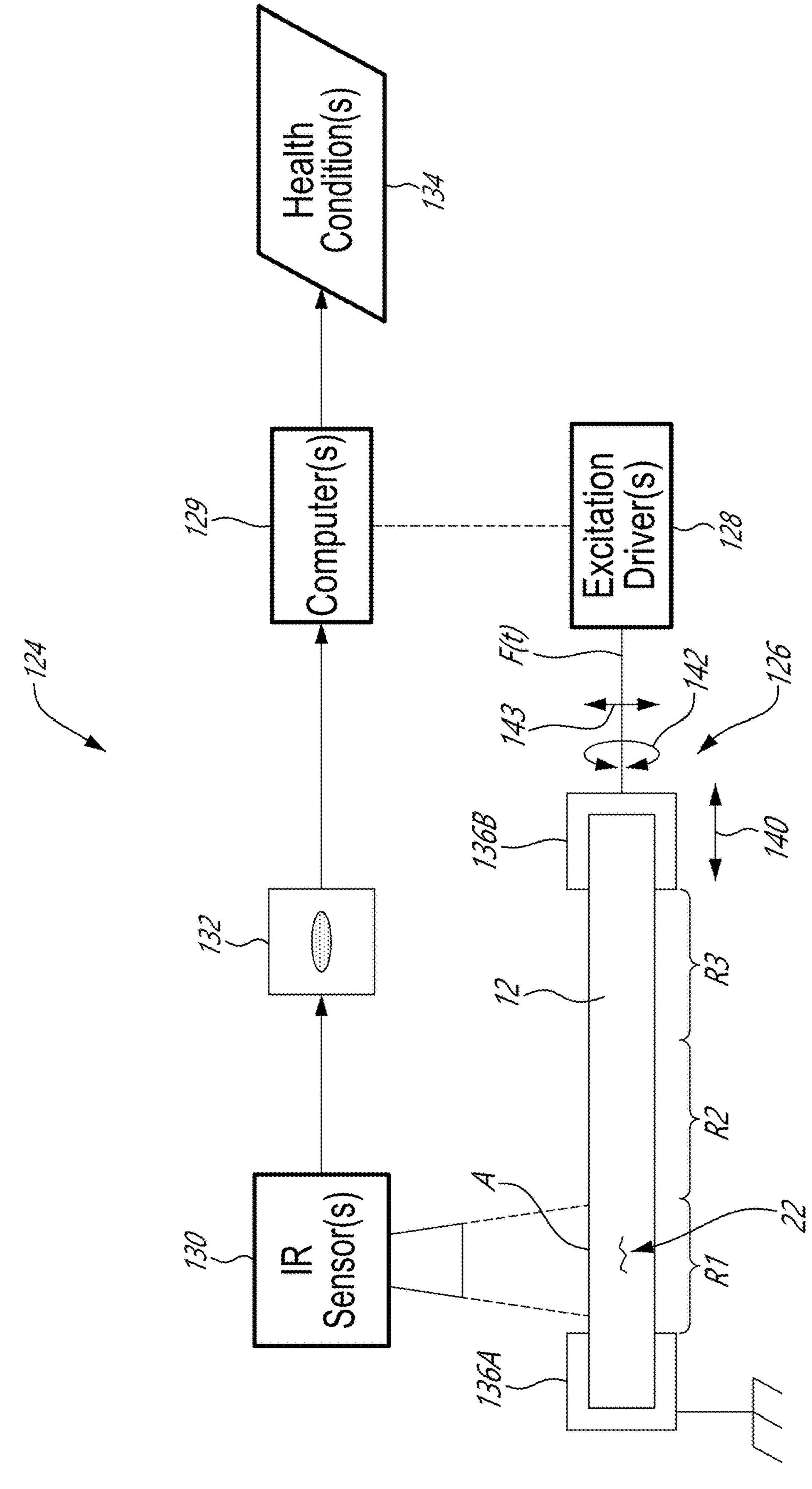
FIG. 3 is a schematic illustration of another exemplary system for evaluating a component of the aircraft power plant.

FIG. 3 is a schematic illustration of another exemplary system 124 for evaluating component 12 of aircraft power plant 10. System 124 may include elements of system 24 and like elements are identified using like reference numerals that have been incremented by 100. Similarly to system 24, system 124 may be operable to determine one or more health conditions 134 of component 12 using infrared non-destructive testing of materials with thermography. The excitation of component 12 may be provided by mechanical loading using transducer 126. Transducer 126 may be configured to apply repeated tensile, compressive, bending and/or torsional loading on component 12. Transducer 126 may include stationary clamp 136A engageable with a first portion of component 12, and actuated (movable) clamp 136B engageable with a second portion of component 12. Actuated clamp 136B may be drivingly connected to an actuator controlled (e.g., driven) by excitation driver 128, which may optionally be operatively connected to computer 129. Excitation driver 128 may operate independently of computer 129 or may operate under the control/supervision of computer 129. In some embodiments, excitation driver 128 and computer 129 may be in data communication with each other so that parameters (e.g., amplitude, frequency) of the excitation may be communicated from computer 129 to excitation driver 128 or from excitation driver 128 to computer 129. The excitation delivered to component 12 may be constant over time or may have one or more parameters that vary as a function of time. The excitation delivered to component 12 may be adjustable. Transducer 126 may be operable in a controlled manner to input cyclic loading F(t) (i.e., as a function of time) into component 12. In some embodiments, transducer 126 may be part of a (e.g., servo-hydraulic) mechanical (e.g., fatigue) testing system.

In some embodiments, actuatable clamp 136B may be actuatable in a reciprocating linear manner along arrow 140 to apply tensile (i.e., stretching) and/or compressive loading to component 12. In some embodiments, actuatable clamp 136B may, alternatively or in addition, be actuatable in a reciprocating rotary manner along arrow 142 to apply torsional loading to component 12. In some embodiments, actuatable clamp 136B may, alternatively or in addition, be actuatable in a reciprocating manner along arrow 143 to apply bending loading to component 12. The mechanical loading applied via actuatable clamp 136B may be applied in a manner that is not intended to (e.g., further) damage component 12 during the test. Accordingly, system 124 may be used to conduct NDT on component 12.

The evaluation of component 12 using system 124 may be conducted while component 12 is not currently being used in power plant 10. For example, the evaluation of component 12 may be conducted while component 12 is uninstalled from power plant 10. Alternatively, the evaluation of component 12 may be conducted while component 12 is installed in power plant 10 and power plant 10 is not in operation. In various embodiments, the mechanical excitation applied to component 12 may not be representative of an expected in-use operating condition of component 12. In other words, the applied mechanical excitation may be different from an expected in-use condition experienced by component 12 during the operation of power plant 10.

Computer 129 may be in data communication with IR sensor 130 to receive digital thermographic image 132 acquired while the mechanical excitation is being applied to component 12 using transducer 126. Using thermographic image 132 and optionally other data, computer 129 may be operable to generate one or more outputs indicative of one or more health conditions 134 of component 12.

The impact of defect 22 on health condition 34 of component may depend on the one or more factors such as the type and geometry of component 12, the location of defect 22 on component 12 and other characteristics (e.g., type, severity) of defect 22. Component 12 may include different regions R1-R3 within which defect 22 may be located and the location of defect 22 may impact health condition 34.

Figure 4:
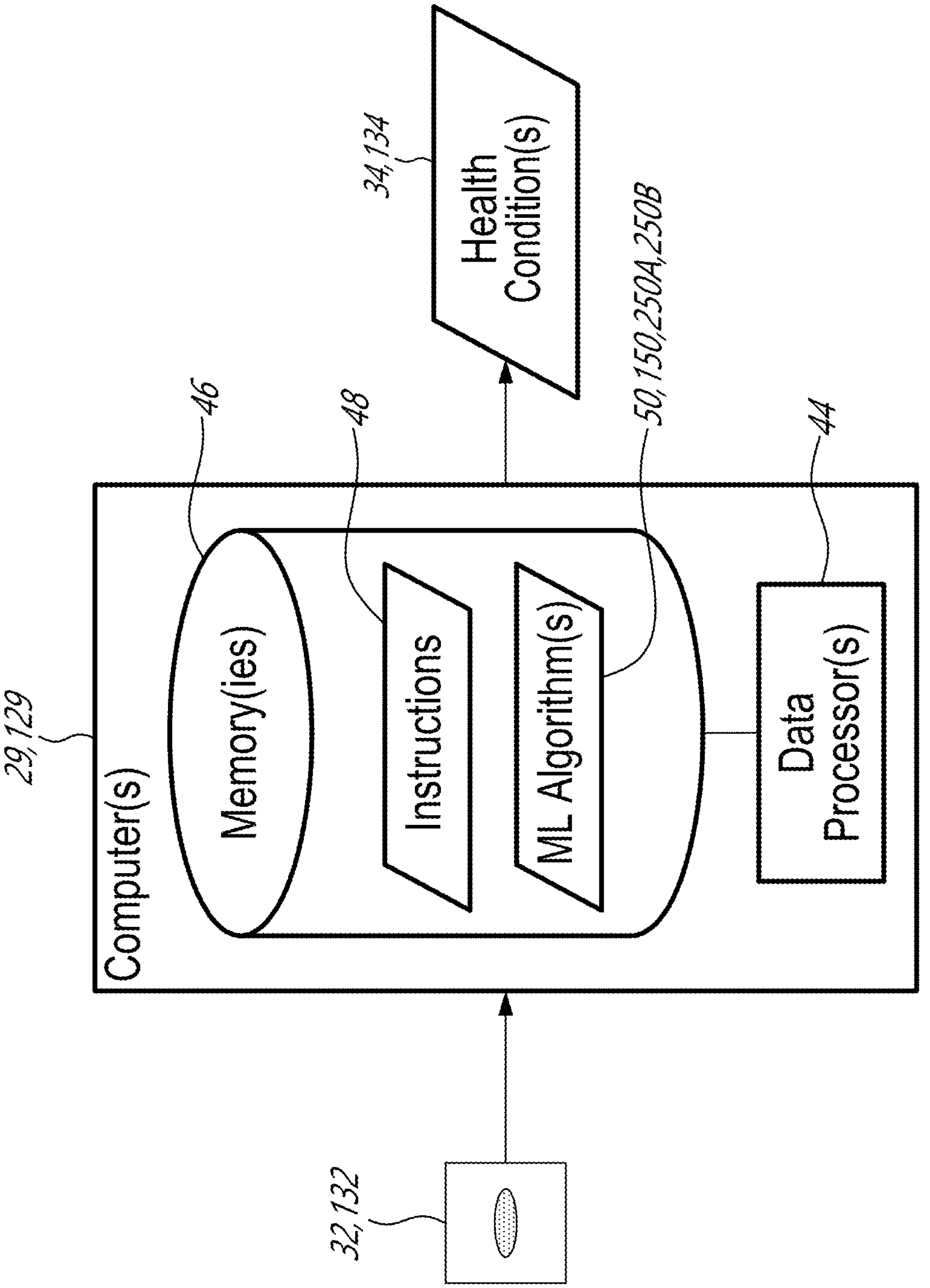
FIG. 4 is a schematic illustration of an exemplary computer of the system of FIG. 3 and/or the system of FIG. 4.

FIG. 4 is a schematic illustration of an exemplary computer 29, 129 of system 24, 124. Computer 29, 129 may be part of a specialized controller or other suitable hardware. Computer 29, 129 may include one or more data processors 44 (referred hereinafter in the singular as "processor 44") and non-transitory machine-readable memory (ies) 46 (referred hereinafter in the singular). Computer 29, 129 may be configured to generate an output (i.e., data) indicative of one or more health conditions 34, 134 based on thermographic image 32, 132 received, and optionally also perform other tasks. Computer 29, 129 may perform one or more procedures or steps defined by instructions 48 (e.g., software, program code) stored in memory 46 and executable by processor(s) 44 to generate health condition(s) 34, 134. Health condition(s) 34, 134 may include an estimated remaining service life of component 12 and may be provided to an operator of system 24, 124 or other maintenance personnel via a display device for example. The remaining service life may be quantified as a number of loading/unloading cycles, a number of flights/missions, a number of hours of operation of power plant 10, or as a fraction (e.g., percentage) of a nominal (e.g., baseline, average, expected) service life of component 12. For example, the nominal service life may be an expected service life of a version of component 12 that is devoid of defects that are outside an acceptable tolerance. Health condition 34, 134 may include an identification of a service category from a limited set of possible service categories such as "acceptable", "needs rework" and "rejected", for example.

Processor(s) 44 may include any suitable device(s) configured to cause a series of steps to be performed by computer 29, 129 so as to implement a computer-implemented process such that instructions 48, when executed by computer 29, 129 or other programmable apparatus, may cause the functions/acts specified in the methods described herein to be executed. Processor(s) 44 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 46 may include any suitable machine-readable storage medium. Memory 46 may include non-transitory computer-readable storage medium such as, for example, but not limited to, an electronic, magnetic, optical, electromagnetic, infrared, or semiconductor system, apparatus, or device, or any suitable combination of the foregoing. Memory 46 may include any storage means (e.g., devices) suitable for retrievably storing machine-readable instructions 48 executable by processor(s) 44. In some embodiments, one or more computer-implemented trained digital models such as ML algorithms 50, 150, 250A, 250B may also be stored in memory 46. ML algorithm(s) 50, 150, 250A, 250B may be trained using ML and historical data associating previous thermographic images with previous health conditions relevant to component 12. ML algorithm(s) 50, 150, 250A, 250B may be one or more suitable artificial intelligence models. In some embodiments, ML algorithm(s) 50, 150, 250A, 250B may each include a trained artificial neural network (ANN) as explained below. Instructions 48 may be executable by processor 44 and configured to cause processor 44 to use ML algorithm(s) 50, 150, 250A, 250B and one or more new thermographic images 32, 132 to assign health condition 34, 134 to component 12 based on new thermographic image(s) 32, 132.

Figure 5:
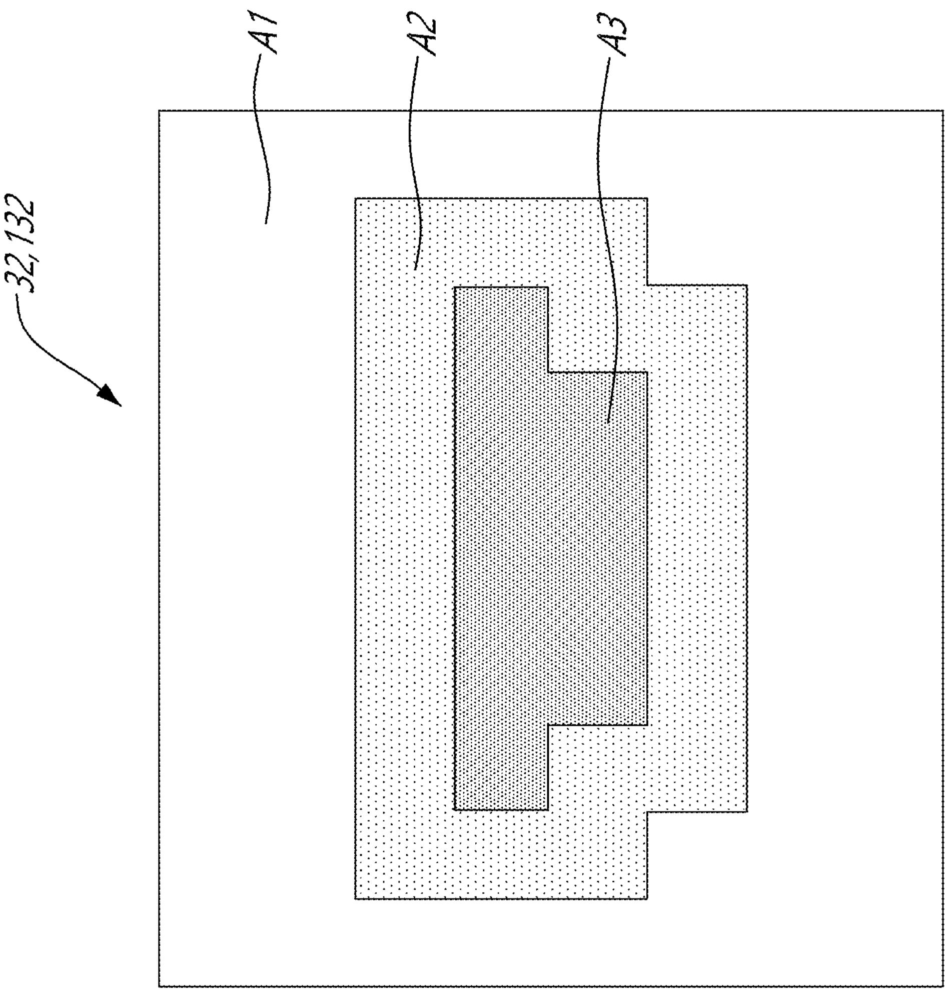
FIG. 5 is a schematic representation of a magnified portion of a digital thermographic image acquired with the system of FIG. 3 and/or the system of FIG. 4.

FIG. 5 is a schematic representation of a magnified portion of digital thermographic image 32, 132 acquired with the system of FIG. 3 and/or the system of FIG. 4. Thermographic image 32, 132 may also be referred to as a thermal image or a thermogram and may provide a visual display of the amount of infrared energy emitted, transmitted, and reflected by an object. Accordingly, areas of different colors within thermographic image 32, 132 may represent areas of different temperatures on component 12. The representation of thermographic image 32, 132 shown in FIG. 5 also shows pixels of different shades (i.e., values) in greyscale to represent different colors in thermographic image 32, 132. Pixels in first area A1 have a lighter shade to represent a lower temperature. Pixels in third area A3 have a darker shade to represent a higher temperature corresponding to the location of defect 22, which may be internal and below an outer surface of component 12. Pixels in second area A2 have an intermediate shade to represent a temperature that is between those of first area A1 and third area A3. Thermographic image 32, 132 may have additional shades and/or colors to illustrate temperature gradients. The location of thermographic image 32, 132 relative to the geometry of component 12 may be known so that the location of defect 22 on component 12 may be determined and optionally used to determine health condition 34, 134.

When analyzing thermographic image 32, 132, computer 29, 129, through the use of ML algorithm(s) 50, 150, 250A, 250B, may evaluate the values of the pixels in thermographic image 32, 132. ML algorithm(s) 50, 150, 250A, 250B may use image post-processing to establish a thermographic map which may allow to identify defect 22 by analyzing thermal variations. For example, computer 29, 129 may use the values of the pixels to extract thermographic features from thermographic image 32, 132 and assess one or more characteristics of defect 22. Thermographic features may include: a relative percentage of the total area A that is covered by defect 22 (e.g., the fraction of area A1 over the total area A1+A2+A3); dimensions (e.g., length, width) of second area A2 and/or of third A3; the shape of second area A2 and/or of third A3; the location of defect 22 on component 12 (e.g., whether defect 22 is proximate to an edge, to a blade root or to a blade tip); the thermal diffusivity of defect 22 by considering the transient and steady state responses to the excitation; and/or the population density of defect(s) 22. Computer 29, 129 may also consider a probability of detection and/or confidence interval in detecting certain types of defects with the experimental setup and parameters that are being used.

As explained further below, computer 29, 129 may, in some embodiments, determine health condition 34, 134 directly from thermographic image 32, 132. In some embodiments, computer 29, 129 may first relate/associate thermographic image 32, 132 to one or more characteristics of defect 22 and then relate/associate the characteristic(s) of defect 22 to health condition 34, 134.

Figure 6:
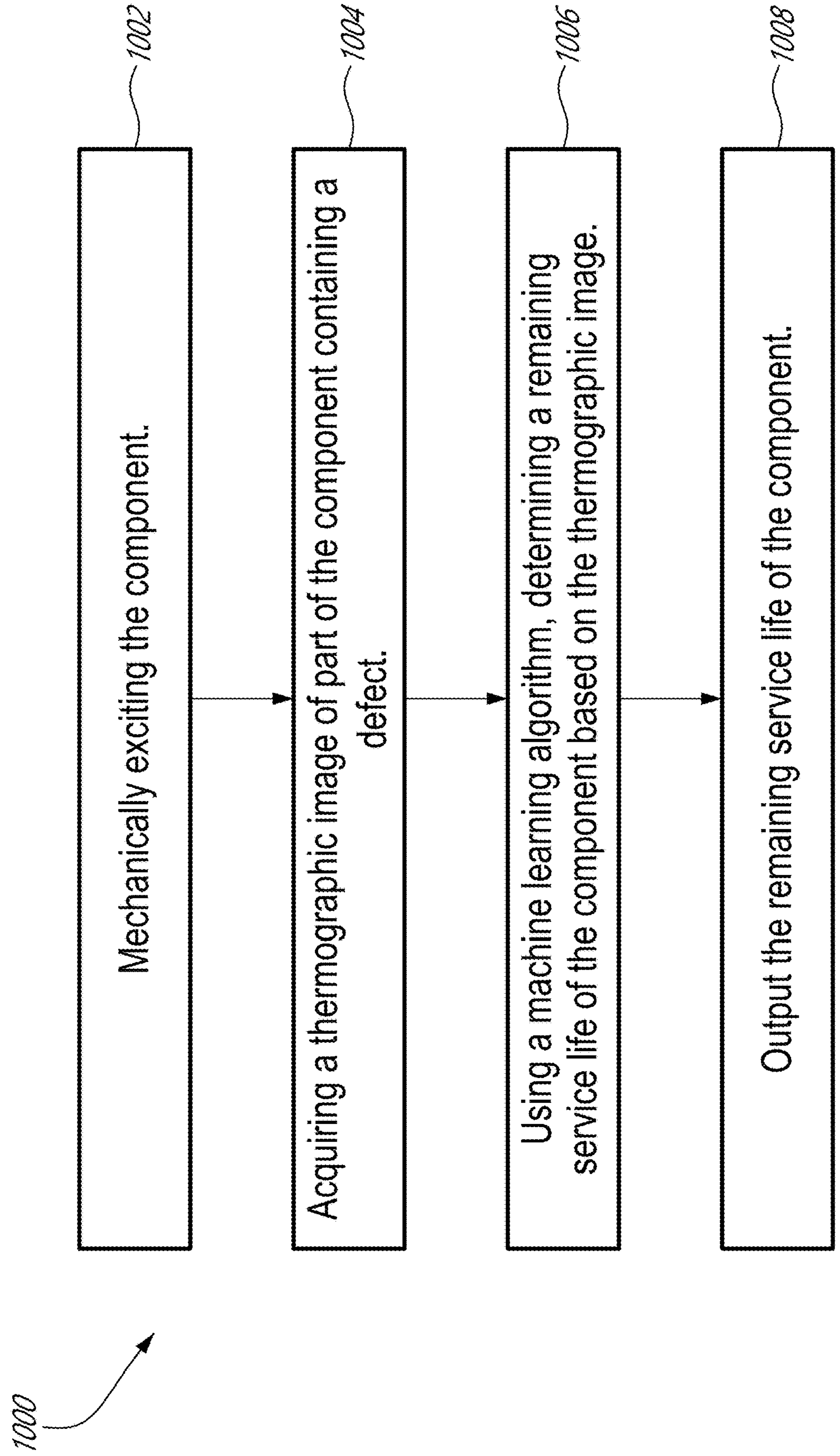
FIG. 6 is a flow diagram of an exemplary method of evaluating a component using thermography.

FIG. 6 is a flow diagram of an exemplary method 1000 of evaluating component 12 or another component using thermography. Method 1000 may be performed using system 24, 124 and/or using another system. For example, machine-readable instructions 48 may be configured to cause computer 29, 129 to perform at least part of method 1000. Method 1000 may include other actions disclosed herein. Method 1000 may include elements of system 24, 124. In various embodiments, method 1000 may include:

- mechanically exciting component 12 to induce a thermal response in component 12 (block 1002);
- acquiring at computer 29, 129 from IR sensor 30, 130 thermographic image 32, 132 of part (e.g., area A) of component 12 containing defect 22 and taken while component 12 exhibits the thermal response (block 1004);
- executing ML algorithm(s) 50, 150, 250A, 250B to process thermographic image 32, 132 to determine the remaining service life of component 12 based on thermographic image 32, 132 (block 1006); and
- generating an output indicative of the remaining service life of component 12 (block 1008).

As explained below, ML algorithm(s) 50, 150, 250A, 250B may have been trained using ML on historical data associating previous thermographic images with previous remaining service lives for component 12. In some embodiments of method 1000, mechanically exciting component 12 may include inducing heat generation within component 12. For example, mechanically exciting component 12 may include inducing a vibration in component 12. Mechanically exciting component 12 may include applying a mechanical excitation to component 12 to induce frictional heating at the location of defect 22.

Using ML algorithm(s) 50, 150, 250A, 250B, determining the remaining service life of component 12 may be based on the location of defect 22 on component 12. For example, for rotor blade of power plant 10, when the location of defect 22 is closer to a root of the rotor blade than to a tip of the rotor blade, the remaining service life may be a first remaining service life. However, when the location of defect 22 is closer to a tip of the rotor blade than to a root of the rotor blade, the remaining service life may be a second remaining service life different from the first remaining service life.

In some embodiments, determining the remaining service life of component 12 may be based on a parameter (e.g., frequency, magnitude, type) of a mechanical excitation used to heat component 12.

In some embodiments, determining the remaining service life of component 12 may be done in one step directly from thermographic image 32, 132. Alternatively, determining the remaining service life of component 12 may be done in two or more steps using thermographic image 32, 132. For example, method 1000 may include identifying a characteristic of defect 22 based on thermographic image 32, 132; and then relating the characteristic of defect 22 to the remaining service life.

Thermographic image 32, 132 and/or characteristic(s) of defect 22 may be compared to one or more predefined signatures, thresholds (e.g., from calibration reference standards), guidelines and/or ranges to determine the appropriate health condition 34, 134. Such signatures, thresholds, guidelines and/or ranges may be predetermined and stored in memory 46. In some embodiments, such signatures, thresholds, guidelines and/or ranges may be stored/represented in ML algorithm(s) 50, 150, 250A, 250B and determined from historical data 52, 152, 252A, 252B that has been used to train ML algorithm(s) 50, 150, 250A, 250B.

Further aspects of method 1000 are described below in relation to the subsequent figures.

Figure 7:
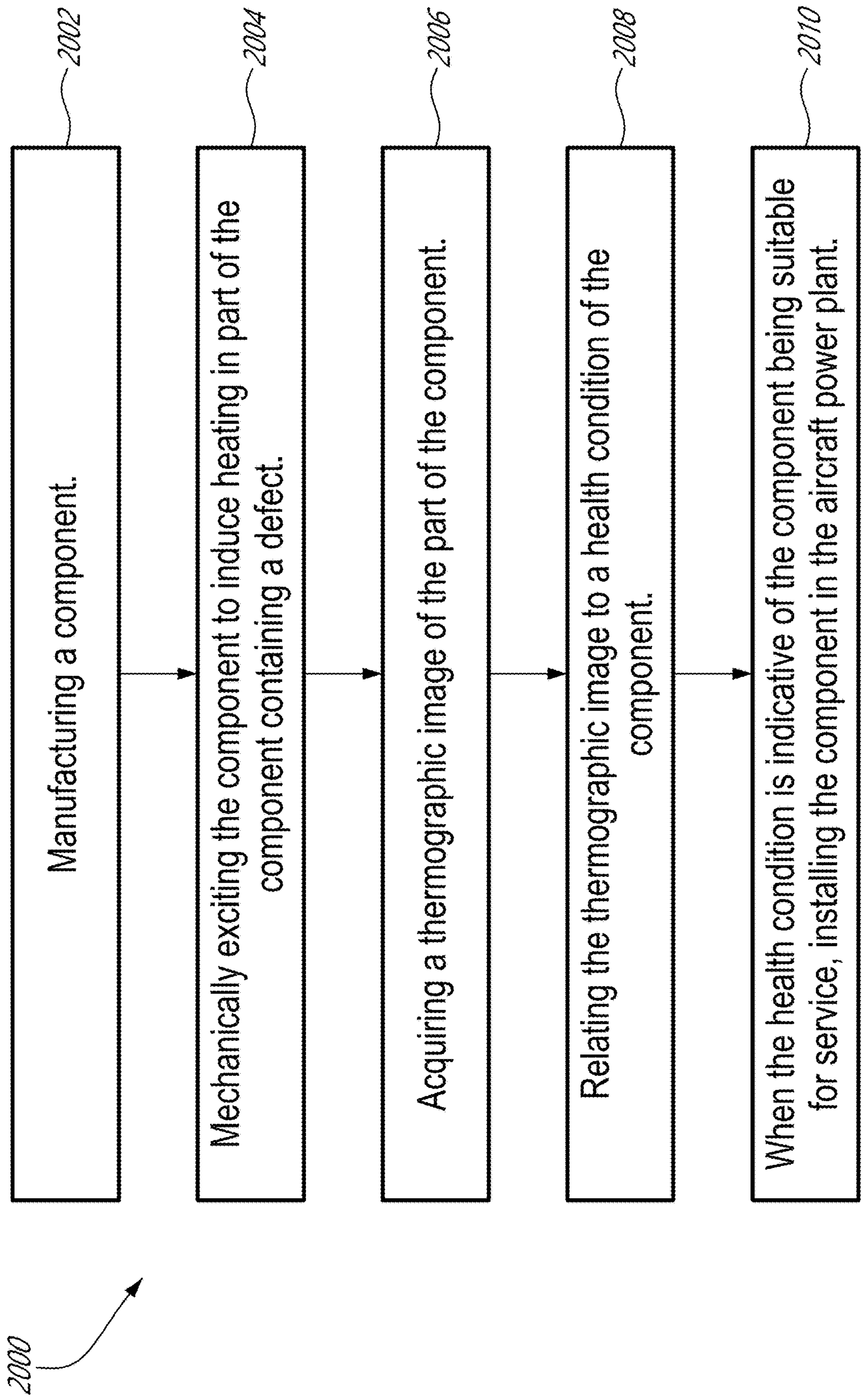
FIG. 7 is a flow diagram of an exemplary method of manufacturing the aircraft power plant.

FIG. 7 is a flow diagram of an exemplary method of manufacturing aircraft power plant 10. Method 2000 may include some or all of method 1000. Method 2000 may be performed using system 24, 124 and/or using another system. For example, machine-readable instructions 48 may be configured to cause computer 29, 129 to perform at least part of method 2000. Method 2000 may include other actions disclosed herein. Method 2000 may include elements of system 24, 124. In various embodiments, method 2000 may include:

- manufacturing component 12 of aircraft power plant 10 (block 2002);
- while component 12 is uninstalled from aircraft power plant 10:
- mechanically exciting component 12 to induce heating in a part of component 12 containing defect 22 (block 2004);
- acquiring thermographic image 32, 132 of the part of component 12 (block 2006); and
- using ML algorithm 50, 150, 250A, 250B, relating thermographic image 32, 132 to health condition 34, 134 of component 12 (block 2008); and
- when health condition 34, 134 is indicative of component 12 being suitable for service, installing component 12 in power plant 10 (block 2010).

Health condition 34, 134 may be indicative of whether the estimated remaining service life of component 12 is sufficient for component 12 to be installed (e.g., fastened) in power plant 10. Health condition 34, 134 may include a quantification of an estimated remaining service life for component 12 and/or may include a service category for component 12. For example, if the remaining service life is determined not to be significantly reduced by defect 22, health condition 34, 134 may be set to the "acceptable" service category (i.e., conforming to applicable quality standard(s)) so that component 12 may be installed into power plant 10 and used during operation of power plant 10. In situations where the remaining service life of component 12 is determined to be unsuitable for service but may be improved by way of repair, health condition 34, 134 may be set to the "needs rework" service category to indicate that component 12 may be repaired to improve its service life. In some situations, repairing component 12 may include replacing a portion of component 12 containing defect 22 with new material. In situations where the remaining service life of component 12 is determined to be unsuitable for service and a characteristic of defect 22 indicates that defect 22 is beyond repair, health condition 34, 134 may be set to the "rejected" service category (i.e., not conforming to applicable quality standard(s)) so that component 12 may not be installed in power plant 10. When health condition 34, 134 is set to the "rejected" service category, component 12 may be discarded or recycled.

In various embodiments, methods 1000 and 2000 may include training ML algorithm(s) 50, 150, 250A, 250B using a suitable ML training algorithm and historical data 52, 152, 252A, 252B relating one or more previous thermographic images to one or more previous health conditions.

In some embodiments, relating thermographic image 32, 132 to health condition 34, 134 of component 12 using ML algorithm(s) 250A, 250B may include relating thermographic image 32, 132 to a characteristic of defect 22; and then relating the characteristic of defect 22 to health condition 34, 134.

In some embodiments, relating thermographic image 32, 132 to health condition 34, 134 of component 12 using ML algorithm(s) 50, 150, 250A, 250B is performed based on: a location on component 12 associated with thermographic image 32, 132; and a parameter (e.g., frequency, magnitude, type) of a mechanical excitation applied to component 12 and associated with thermographic image 32, 132.

Further aspects of method 2000 are described below in relation to the subsequent figures.

Figure 8:
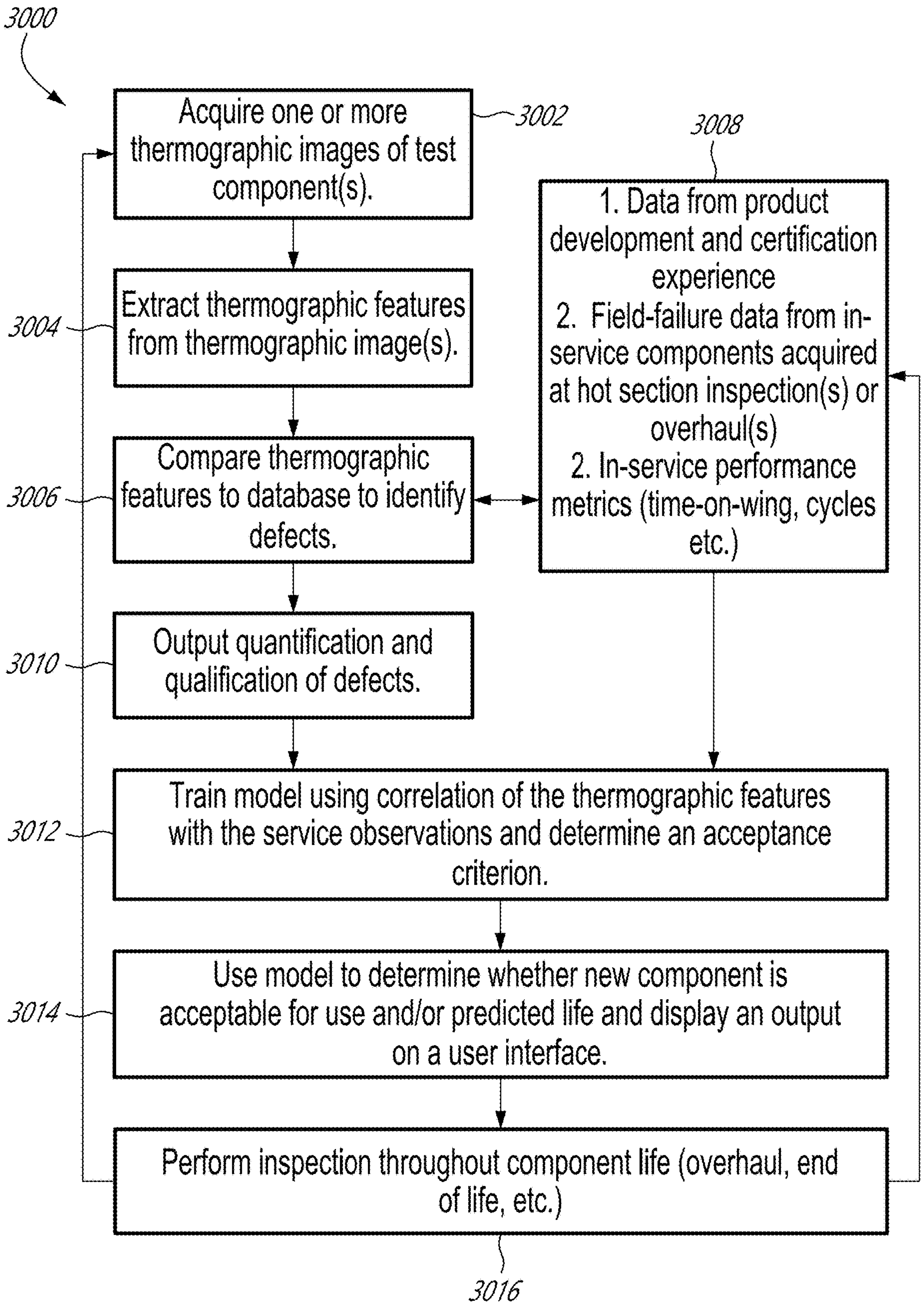
FIG. 8 is a flow diagram of another exemplary method of evaluating a component using thermography.

FIG. 8 is a flow diagram of another exemplary method 3000 of evaluating component 12 using thermography. Method 3000 may include some or all of methods 1000 and/or 2000. Method 3000 may be performed using system 24, 124 and/or using another system. For example, machine-readable instructions 48 may be configured to cause computer 29, 129 to perform at least part of method 3000. Method 3000 may include other actions disclosed herein. Method 3000 may include elements of system 24, 124. Method 3000 may include actions associated with the construction of ML algorithm(s) 50, 150, 250A, 250B as well as actions associated with the use of ML algorithm(s) 50, 150, 250A, 250B.

At block 3002, method 3000 may include the acquisition of thermographic images of one or more test components that undergo evaluation using infrared thermography. The test components may be sufficiently related (e.g., identical and/or of the same type/family) to component 12 so that the information acquired from the test components may be applicable to component 12. At block 3004, thermographic features are extracted from the thermographic images either manually and/or using image analysis software. At block 3006, the extracted thermographic features are compared to a reference database of thresholds and criteria to identify the defects in the test components. Block 3006 includes information that may be included in the reference database. Such information may include data acquired during product development and certification of component 12 (e.g., mechanical testing), field failure data from in-service components acquired at (e.g., hot section) inspection or overhauls of power plant 10, and/or in-service performance metrics such as time-on-wing, hours of operation, number of flight cycles, etc.

Following the comparison at block 3006, block 3010 may include an output of quantification and qualification of different types of defects that have been observed in the test components. At block 3012, the information from block 3010 may be used to train ML algorithm(s) 50, 150, 250A, 250B using correlations of the thermographic features with the service observations. At block 3012, one or more acceptance criteria applicable to component 12 may also be determined.

Once ML algorithm(s) 50, 150, 250A, 250B has/have been trained, ML algorithm(s) 50, 150, 250A, 250B may be used at block 3014 with thermographic image 32, 132 of component 12 to determine health condition 34, 134 (e.g., whether component 12 is acceptable for service and/or what is the remaining service life of component 12). Health condition 34, 134 may be displayed to an operator of system 24, 124 via a display device for example.

At block 3016, further thermographic inspections of component 12 may be performed at different times throughout the life of component 12 and additional in-service data may be generated from such subsequent inspections. The additional data may be used to further train (i.e., refine) ML algorithm(s) 50, 150, 250A, 250B so that the performance (e.g., accuracy) of ML algorithm(s) 50, 150, 250A, 250B may be improved over time in an iterative manner through active learning. The further training of ML algorithm(s) 50, 150, 250A, 250B with the additional data may be performed periodically or continuously as the additional data becomes available.

Further aspects of method 3000 are described below in relation to the subsequent figures.

Figure 9:
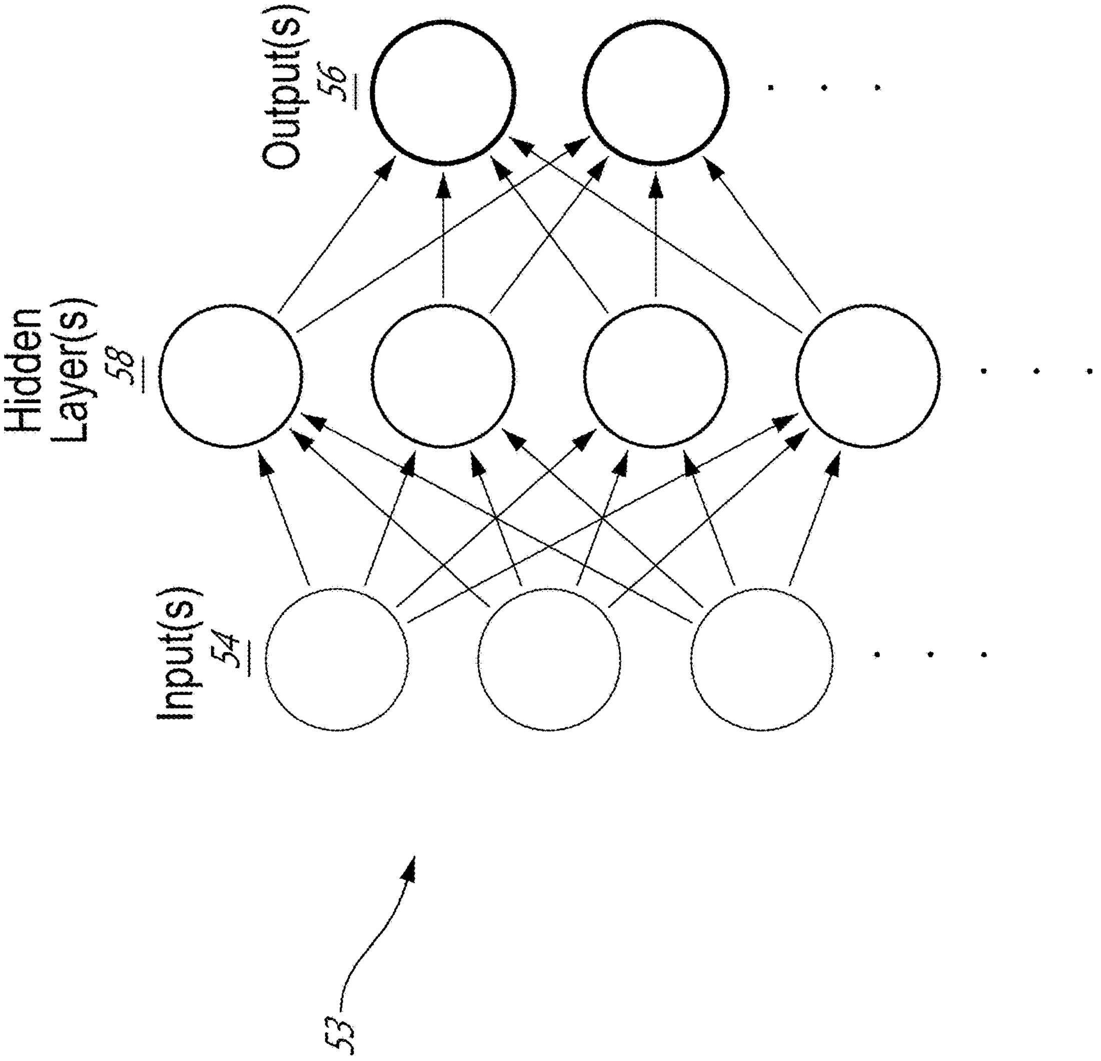
FIG. 9 is a schematic representation of an exemplary machine learning algorithm implemented as an artificial neural network.

FIG. 9 is a schematic representation of an exemplary architecture of an ANN 53 of any one of ML algorithms 50, 150, 250A, 250B. ANN 53 may include interconnected units or nodes called artificial neurons. The illustrated circular nodes represent artificial neurons and the arrows each represent a connection from the output of one artificial neuron to the input of another. Each artificial neuron receives signals from connected neurons, then processes them and sends a signal to other connected neurons. The signal may be a real number, and the output of each neuron may be computed by a function of the sum of its inputs, called an activation function. The strength of the signal at each connection is determined by a weight, which is adjusted iteratively during the learning process (i.e., training). ANN 53 may learn from experience and be trained using training data to derive a suitable health condition 34, 134.

The artificial neurons of ANN 53 may be aggregated into layers. Different layers may perform different transformations on their inputs. Signals may travel from the input layer 54 (referred hereinafter as "input 54") to the output layer 56 (referred hereinafter as "output 56") by passing through one or more intermediate hidden layers 58. In some embodiments, ANN 53 may be a deep neural network having two or more hidden layers 92. One or more ANNs 53 may be used to relate thermographic image 32, 132 to a corresponding health condition 34, 134 during operation of system 24, 124. In some embodiments, ANN 53 may be a long short-term memory network. In some embodiments, ANN 53 may be a convolutional neural network (CNN) suitable to perform analysis on thermographic image 32, 132. The CNN may be a feed-forward neural network that learns features by itself via filter (or kernel) optimization.

Figure 10:
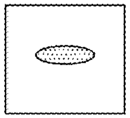
FIG. 10 shows a table containing exemplary historical data used to train a machine learning algorithm using machine learning.
Figure 10:
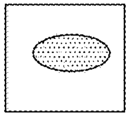
Figure 10:
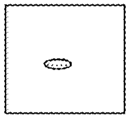
Figure 10:
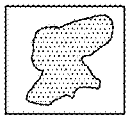
Figure 10:
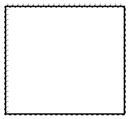

FIG. 10 shows a table containing exemplary labeled historical data 52 used as a ML dataset to train ML algorithm(s) 50 using a suitable ML training algorithm. Historical data 52 may be stored in a database and training of ML algorithm(s) 50 may be performed with computer 29, 129 or with another computer. ML algorithm(s) 50 may be trained to relate previous thermographic images as input(s) 54 to ANN 53 directly to previous health conditions as output(s) 56 of ANN 53. The health condition(s) may include an estimate of the remaining service life of component and/or a service category such as "acceptable", "needs rework" or "rejected" for example. Historical data 52 may be used to train ANN 53 in an iterative and supervised ML manner. In some embodiments, ML algorithm(s) 50 may include one or more classifiers having an algorithm that automatically orders or categorizes data into one or more of a set of classes such as a service category for example.

In some embodiments, ML algorithm(s) 50 may include a regression algorithm that automatically assigns a numerical value that is within a range. For example, in some embodiments, ML algorithm(s) 50 may be configured to relate thermographic image 32, 132 and optionally other input(s) 54 to a specific value of the remaining service life. The specific value may be a number of loading/unloading cycles, a number of flights/missions, a number of hours of operation of power plant 10, or as a fraction (e.g., percentage) of a nominal (e.g., baseline, average, expected) service life of component 12.

Figure 11:
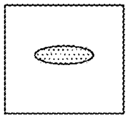
FIG. 11 shows a table containing other exemplary historical data used to train a machine learning algorithm using machine learning.
Figure 11:
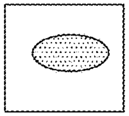
Figure 11:
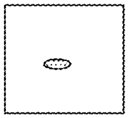
Figure 11:
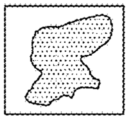
Figure 11:
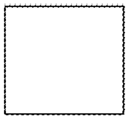
Figure 11:
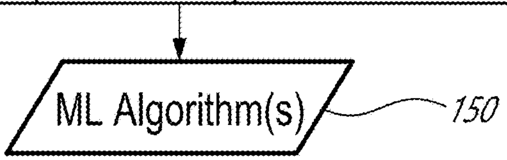

FIG. 11 shows a table containing other exemplary labeled historical data 152 used as a ML dataset to train ML algorithm(s) 150 using a suitable ML training algorithm. Historical data 152 may be stored in a database and training of ML algorithm(s) 150 may be performed with computer 29, 129 or with another computer. ML algorithm(s) 150 may be trained to relate previous thermographic images and optionally one or more additional parameters as input(s) 54 to ANN 53 directly to previous health conditions as output(s) 56 of ANN 53. The additional parameters may include one or more excitation parameters E1-E5 (e.g., frequency, magnitude, type), a location (e.g., regions R1-R3) of the defect on the component and/or other parameters. The previous health conditions may include an estimate of the remaining service life of the component and/or a service category such as "acceptable", "needs rework" or "rejected" for example. Historical data 152 may be used to train ANN 53 in an iterative and supervised ML manner. In some embodiments, ML algorithm(s) 150 may include one or more classifiers having an algorithm that automatically orders or categorizes data into one or more of a set of classes such as a service category for example.

In some embodiments, ML algorithm(s) 150 may include a regression algorithm that automatically assigns a numerical value that is within a range. For example, in some embodiments, ML algorithm(s) 150 may be configured to relate thermographic image 32, 132 and optionally other input(s) 54 to a specific value of remaining service life. The specific value may be a number of loading/unloading cycles, a number of flights/missions, a number of hours of operation of power plant 10, or as a fraction (e.g., percentage) of a nominal (e.g., baseline, average, expected) service life of component 12.

FIGS. 12A and 12B show tables containing exemplary labeled historical data 252A used as a ML dataset to train ML algorithm(s) 250A, and labeled historical data 252B used as a ML dataset to train ML algorithm(s) 250B. Historical data 252A, 252B may be stored in a database and training of ML algorithm(s) 250A, 250B may be performed with computer 29, 129 or with another computer. Using ML algorithms 250A, 250B, the evaluation of component 12 may be achieved via a first action of relating the thermographic image 32, 132 and optionally other input(s) 54 to a characteristic of defect 22, and a second action of relating the characteristic of defect 22 and optionally other input(s) 54 to health condition 34, 134. In other words, first ML algorithm(s) 250A, second ML algorithm(s) 250B and optionally other ML algorithm(s) may be use sequentially to establish the relation between thermographic image 32, 132 to health condition 34, 134.

First ML algorithm(s) 250A may be trained to relate previous thermographic images and optionally one or more additional parameters (as shown in FIG. 10) as input(s) 54 to ANN 53 to one or more characteristics of previous defects as output(s) 56 of ANN 53. Characteristics of defects may, for example, include a type of defect (e.g., crack, void, porosity), a size of the defect (e.g., specific dimension or relative term such as "small", "medium" or "large"), an orientation of an elongated defect such as a crack, void or microporosity (e.g., transverse or parallel to a loading axis), and/or a severity (e.g., relative term such as "low", "medium" or "high"). Historical data 252A may be used to train ANN 53 in an iterative and supervised ML manner. In some embodiments, first ML algorithm(s) 250A may include one or more classifiers and/or one or more regression algorithms.

Second ML algorithm(s) 250B may be trained to relate the characteristic(s) of previous defects that is/are output from first ML algorithm(s) 250A and optionally one or more additional parameters as input(s) 54 to ANN 53 to previous health conditions as output(s) 56 of ANN 53. Historical data 252B may be used to train ANN 53 in an iterative and supervised ML manner. In some embodiments, second ML algorithm(s) 250B may include one or more classifiers and/or one or more regression algorithms.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A method for quantifying a remaining service life of a component containing a defect using non-destructive infrared thermography, the method comprising:

mechanically exciting the component to induce a thermal response in the component;

acquiring at a computer from an infrared sensor a thermographic image of a part of the component containing the defect and taken while the component exhibits the thermal response;

executing a machine learning algorithm to process the thermographic image to determine the remaining service life of the component based on the thermographic image; and generating an output indicative of the determined remaining service life of the component, wherein the machine learning algorithm has been trained using machine learning on historical data associating previous thermographic images with previous remaining service lives for the component.

2. The method as defined in claim 1, wherein mechanically exciting the component includes stretching the component.

3. The method as defined in claim 1, wherein mechanically exciting the component includes inducing a vibration in the component.

4. The method as defined in claim 1, comprising using the machine learning algorithm to determine the remaining service life of the component based on a parameter of a mechanical excitation used to mechanically excite the component.

5. The method as defined in claim 1, comprising using the machine learning algorithm to determining the remaining service life of the component based on a location of the defect on the component.

6. The method as defined in claim 5, wherein:

the component is a rotor blade of an aircraft power plant;

when the location of the defect is closer to a root of the rotor blade than to a tip of the rotor blade, the remaining service life is a first remaining service life; and when the location of the defect is closer to a tip of the rotor blade than to a root of the rotor blade, the remaining service life is a second remaining service life different from the first remaining service life.

7. The method as defined in claim 6, wherein mechanically exciting the component includes inducing frictional heating at the defect.

8. The method as defined in claim 1, wherein determining the remaining service life of the component includes:

identifying a characteristic of the defect in the component based on the thermographic image; and relating the characteristic of the defect to the remaining service life.

9. The method as defined in claim 1, wherein:

mechanically exciting the component includes applying a mechanical excitation to the component to induce frictional heating at the defect; and the method includes, using the machine learning algorithm, determining the remaining service life of the component based on a location of the defect within the component and based on a parameter of the mechanical excitation.

10. A method of manufacturing an aircraft power plant, the method comprising:

manufacturing a component of the aircraft power plant;

while the component is uninstalled from the aircraft power plant:

mechanically exciting the component to induce heating in a part of the component containing a defect;

acquiring a thermographic image of the part of the component; and using a machine learning algorithm, relating the thermographic image to a health condition of the component; and when the health condition is indicative of the component being suitable for service, installing the component in the aircraft power plant.

11. The method as defined in claim 10, comprising training the machine learning algorithm using machine learning and historical data relating a previous thermographic image to a previous health condition.

12. The method as defined in claim 10, wherein mechanically exciting the component includes acoustically exciting the component.

13. The method as defined in claim 10, wherein mechanically exciting the component includes stretching and/or contracting the component.

14. The method as defined in claim 10, wherein the health condition includes a remaining service life of the component.

15. The method as defined in claim 10, wherein relating the thermographic image to the health condition of the component using the machine learning algorithm includes classifying the thermographic image as belonging to a service category for the component.

16. The method as defined in claim 10, wherein relating the thermographic image to the health condition of the component using the machine learning algorithm includes:

relating the thermographic image to a characteristic of the defect; and relating the characteristic of the defect to the health condition.

17. The method as defined in claim 10, wherein relating the thermographic image to the health condition of the component using the machine learning algorithm is performed based on:

a location of the defect on the component; and a parameter of a mechanical excitation applied to the component and associated with the thermographic image.

18. A system for non-destructive evaluation of a component using infrared thermography, the system comprising:

a transducer operable to induce a vibration in the component;

an infrared sensor operable to acquire a new thermographic image of the component;
one or more data processors; and
non-transitory machine-readable memory storing:
a trained model trained using machine learning and historical data associating previous thermographic images with previous health conditions of the component; and
instructions executable by the one or more data processors and configured to cause the one or more data processors to:
using the trained model and the new thermographic image, assign a health condition to the component based on the new thermographic image; and
generate an output indicative of the health condition of the component.

19. The system as defined in claim 18, wherein the health condition is a remaining service life of the component.

20. The system as defined in claim 18, wherein the health condition is a service category for the component.

* * * * *